United States Patent [19]

Juhn et al.

[11] 4,118,519
[45] Oct. 3, 1978

[54] METHOD OF PRODUCING SMOKE FLAVORING FOR FOODS

[75] Inventors: Hyunil Juhn; Hugo E. Wistreich, both of Chicago, Ill.

[73] Assignee: B. Heller & Company, Chicago, Ill.

[21] Appl. No.: 713,390

[22] Filed: Aug. 11, 1976

[51] Int. Cl.² .............................................. A23L 1/232
[52] U.S. Cl. .................................... 426/533; 426/613; 426/650; 426/429
[58] Field of Search ............... 426/533, 314, 315, 611, 426/613, 601, 650, 652, 425, 429, 417, 651

[56] References Cited

U.S. PATENT DOCUMENTS

| | | | |
|---|---|---|---|
| 3,467,527 | 9/1969 | Wistreich | 426/314 X |
| 3,480,446 | 11/1969 | Hallenbeck | 426/650 X |
| 3,833,743 | 9/1974 | Morse et al. | 426/651 X |

*Primary Examiner*—Raymond N. Jones
*Assistant Examiner*—Esther M. Kepplinger
*Attorney, Agent, or Firm*—McDougall, Hersh & Scott

[57] ABSTRACT

A composition for imparting a smoke flavor to foods in which the composition is prepared by liquid-liquid extraction of an aqueous liquid smoke with an edible oil containing mono- and diglyceride of a fat forming fatty acid or other edible surface active agent having an HLB below 7 and preferably within the range of 2.0 to 3.5.

4 Claims, No Drawings

METHOD OF PRODUCING SMOKE FLAVORING FOR FOODS

This invention relates to the preparation of smoke flavored food products and to compositions for use in the preparation of same.

Originally smoking for the purpose of preservation and/or flavoring food products was accomplished by exposing the food product to smoke derived from the combustion of fissionable material, such as hardwood-sawdust, along with the generation of heat. Such smoking process is very inefficient and quite variable in its effectiveness for imparting the desired preservation and flavor to the food product.

Many of the problems and inefficiencies of direct smoke generation by the burning of hardwood-sawdust and the like have been mitigated by the use of a liquid smoke in which the smoke vapors generated in the usual manner from the burning of fissionable material are passed in contact with water or other aqueous medium whereby the smoke components are extracted from the vapor into the aqueous medium. Reference may be made to U.S. Pat. No. 3,330,669 for a description of a process for the preparation of aqueous liquid smoke wherein the smoke from the burning of wood is extracted with an aqueous medium.

In use, the aqueous liquid smoke is vaporized by heating to elevated temperature to regenerate the smoke for the smoking of food products maintained within an enclosure and into which the regenerated smoke is introduced. Such processes making use of aqueous liquid smoke are described in an article entitled "Application of Liquid Natural, Artificial Smoke in Meat Processing," by Hugo E. Wistreich and published in the National Provisioner, Oct. 14, 1967, or as described in U.S. Pat. No. 3,861,291, issued Jan. 21, 1975, and entitled "Liquid Smoke Regenerator."

Many food products, because of their size, processing conditions, or composition do not lend themselves to easy application of smoke generated in smoke houses or regenerated from aqueous liquid smoke. Such food products may be represented as large sausages, canned ham and luncheon meats, canned soups, stews, barbecued beans and meat products, oil packed seafoods, such as sardines, oil packed pet foods, prepared frozen foods, salad dressings, snack foods such as potato chips, corn chips, puffed pork rind, and party dips.

This problem has been overcome by the transfer of smoke flavoring ingredients from the aqueous liquid smoke to an edible oil base, by liquid-liquid extraction, whereby the edible oil containing the smoke flavoring components extracted from the aqueous system can thereafter be used for incorporation in the desired amounts into the food product to impart the desired level of smoke flavor.

The above concept has been described in an article entitled "Permits Smoking of Unsmokable Products," by Wistreich and Hallenbach, and published in Food Processing and Marketing, pages 70-71, May 1966.

It has been found that the concentration of smoke flavoring components extracted from the aqueous liquid smoke into the oil base is quite low by comparison with the amount of such components originally present in the aqueous medium. As a result, an excessive amount of such oil extraction is required to be incorporated into the food product in order to impart the desired amount of smoke taste or flavor. It is estimated that less than one-third of the smoke flavoring ingredient in the aqueous liquid smoke is extracted into the oil base component. This low degree of extraction is believed to result from the lesser solubility of such smoke flavoring ingredients in oil by comparison with acidic aqueous medium.

It is an object of this invention to provide a method, means and composition for oil extraction of a much higher concentration of smoke flavoring ingredients from aqueous liquid smoke and it is a related object to produce an oil based smoke flavoring having a relatively high concentration of smoke flavoring ingredient.

It has been found, in accordance with the practice of this invention, that when a mono- and diglyceride of a fat forming fatty acid is present in the oleaginous phase, the amount of smoke flavoring ingredient extracted from the aqueous liquid smoke by liquid-liquid extraction is increased by as much as two-fold and more, depending somewhat on the concentration of the mono- and diglyceride in the oil base as well as the ratio of aqueous liquid smoke to the oil base.

The amount of mono- and diglyceride in the oil can be varied, depending somewhat on the amount of extraction desired and the amount of emulsification that can be tolerated in the oil based product. Use can be made of an amount within the range of 1-20% by weight of the oleaginous material but it is preferred to make use of an amount of the glyceride within the range of 1-10% and more preferably 1-5% by weight since little benefit is derived from the presence of the glyceride in an amount greater than 5% by weight of the oil.

It is undesirable to carry out the liquid-liquid extraction for transfer of smoke flavoring ingredient from the aqueous liquid smoke to the oil base at a temperature above 80° C. since, above such temperature, the amount of smoke flavoring ingredient extracted is reduced and a noticeable burning oil flavor can be detected. Liquid-liquid extraction, with compositions embodying the features of this invention, should be carried out at a temperature within the range of 5°-80° C. and preferably at about ambient temperature.

Having described the basic concept of the invention, illustration will be made by way of examples in which the concentration of smoke flavoring ingredients in the aqueous phase and extracted into the oleaginous phase is calculated with reference to the amount of 2,6-dimethoxyphenol, guaiacol, and other phenolics believed to be instrumental in the development of the smoke flavor. The calculations for the presence of phenolics in the various solutions can be made by conventional means, such as by the modified Gibbs' method.

In aqueous liquid smoke derived by the absorption of smoke flavoring ingredients from burning wood smoke, as described in the aforementioned patent, the concentration of such phenolic components has been calculated to vary within the range of 12-15 mg/ml.

EXAMPLE 1

As a control, soybean oil, without added mono- and diglyceride of fat forming fatty acids, was subjected to liquid-liquid extraction by vigorous mixing for 15 minutes at room temperature with an aqueous liquid smoke containing 12.2 mg/ml of smoke flavoring ingredients, in which the calculation was based upon the phenolic components. The mixture was allowed to stand to enable stratification of the oily phase from the aqueous phase, after which the phases were separated. The oil phase was found to contain 3.2 mg/ml of phenolics, of the type described above, leaving about 9.0 mg/ml in the aqueous phase, giving an extraction efficiency K of 3.2/9.0 = 0.36.

EXAMPLE 2

The same procedure of Example 1 was followed except that the soybean oil was modified to contain a mixture of mono- and diglyceride of fat forming fatty acids having an HLB (hydrophilic-lypophilic balance) of 2.8. The amount was varied in separate experiments for concentrations of 1%, 5%, 10% and 20% by weight with the following results:

| mono- diglyceride added to soybean oil in % by weight | K value |
| --- | --- |
| 1 | 0.90 |
| 5 | 1.00 |
| 10 | 1.06 |
| 20 | 1.31 |

It will be seen from the above that the amount of smoke flavoring ingredients extracted from the aqueous liquid smoke is increased by about 100% when the oil base extractant is formulated to contain 1-10% by weight of the mono- diglyceride, and the amount is increased when the concentration of glyceride is increased up to 20% by weight.

We have succeeded, in accordance with the practice of this invention, in achieving an extraction of as much as 10.2 mg/ml of the smoke flavoring phenolic ingredients from an aqueous liquid smoke originally containing 12.4 mg/ml of the smoke flavoring phenolics to give a K value of 5.1. However, the desired smoke flavor is provided when the K value is as high as 1 so that there is no need for an oil base containing a higher concentration of mono- and diglyceride, especially in view of the fact that such higher concentrations leads to water in oil emulsification or cloudiness in food products prepared with same.

The K value can be easily adjusted simply by change in the level of mono- and diglyceride and/or by altering the ratio of oil base to aqueous liquid smoke, in which an increase in the amount of aqueous liquid smoke to oil gives an increase in the amount of smoke flavoring ingredients in the oil base.

The soybean oil in the foregoing examples can be substituted, in whole or in part, with corresponding amounts of other edible oils, such as vegetable oils represented by corn oil, safflower seed oil, peanut oil, lard oil, olive oil, or mineral oils and the like.

The mono- diglyceride used in the foregoing examples can be replaced in whole or in part with corresponding amounts of monoglyceride, diglyceride, or other surface active agent characterized by low polarity, high affinity for oil, and low affinity for water, and which is freely miscible with the oil base, which does not contribute an undesirable appearance or flavor to the final product, which is edible and presents no health hazard, and which is characterized by an HLB below 7 and preferably within the range of 2.0 to 3.5.

The resulting product can be incorporated, in desired amounts, directly into the food product for admixture therewith or in the liquid medium in which the food product is packaged, such as in the case of sardines canned in oil, and the like.

It will be understood that changes may be made in the details of formulation and operation without departing from the spirit of the invention, especially as defined in the following claims.

We claim:

1. A method for producing a smoke flavoring composition for foods comprising providing an aqueous liquid smoke containing smoke flavoring ingredients extracted from smoke vapors, contacting the aqueous liquid smoke with an edible oil having dissolved therein a mono and/or diglyceride of a fat forming fatty acid having an HLB below 7 by liquid-liquid extraction in an amount to constitute 1-20% by weight of the composition, whereby smoke flavoring ingredients are extracted by the edible oil from the aqueous liquid smoke, and then separating the aqueous phase from the oily phase containing smoke flavoring ingredients extracted from the aqueous liquid smoke.

2. A method as claimed in claim 1 in which the edible oil is a vegetable oil.

3. A method as claimed in claim 1 in which the edible oil is selected from the group consisting of corn oil, soybean oil, peanut oil, olive oil, coconut oil, palm oil, lard oil and mineral oil.

4. A method as claimed in claim 1 in which the glyceride has an HLB within the range of 2.0 to 3.5.